Sept. 1, 1959    J. MEIER    2,902,272
LABORATORY BALANCE

Filed April 12, 1956    2 Sheets-Sheet 2

United States Patent Office 2,902,272
Patented Sept. 1, 1959

2,902,272

LABORATORY BALANCE

Johann Meier, Stafa, Switzerland, assignor to Erhard Mettler, Zollikon, Zurich, Switzerland Application April 12, 1956, Serial No. 577,843

Claims priority, application Switzerland June 20, 1955

2 Claims. (Cl. 265—54)

This invention relates to a laboratory balance and in particular to an analytical or micro-balance.

The object of the invention is to provide a laboratory balance comprising a balance rack, a balance beam fulcrumed on said balance rack, a carrier system pivoted on one arm of said balance beam, a disc-shaped friction member on said carrier system, a disc-shaped spring, a brake pin secured to the central part of said disc-shaped spring and projecting freely in the vertical direction towards said disc-shaped friction member, a supporting member guided in said balance rack for vertical displacement with respect thereto, a spring housing secured to said supporting member for holding the outer edge of said disc-shaped spring, and manually operable means on said balance rack for moving said vertically displaceable brake pin into engagement with said disc-shaped friction member in order to extinguish pendulum oscillations which said carrier system may execute. A further object of the invention is, in a laboratory balance of the type stated, to clamp the outer edge of said disc-shaped spring between said spring housing and a cover secured to it, said cover having a centrally disposed aperture through which said brake pin projects freely. The spring housing may be screwed into said supporting member for relative vertical displacement thereto, and the disc-shaped spring may have recesses provided between its outer edge and said brake pin which surround said brake pin in the form of a spiral.

Figure 1:
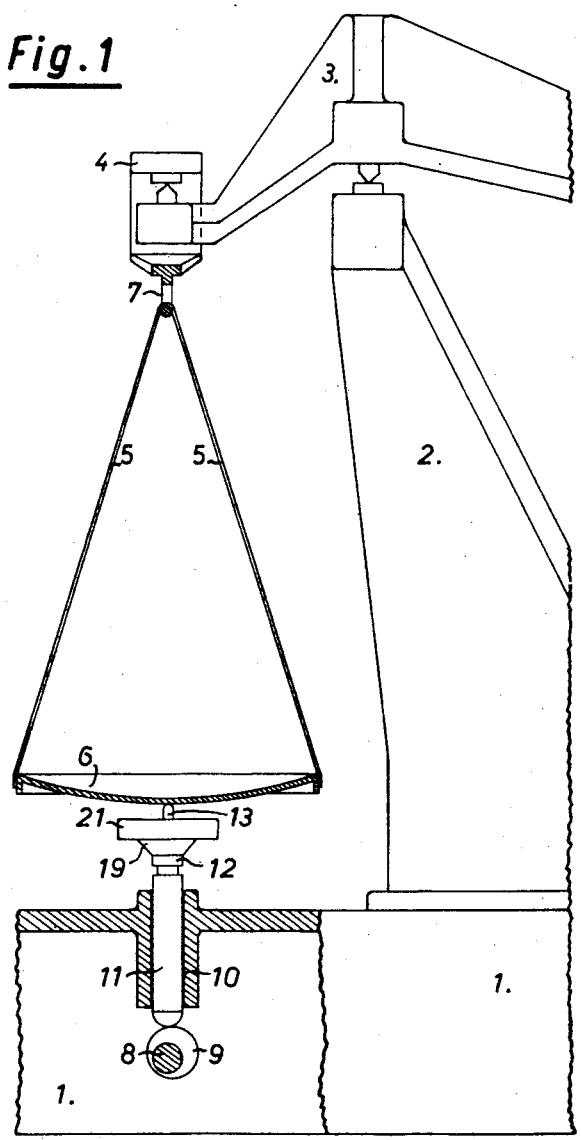
Figure 3:
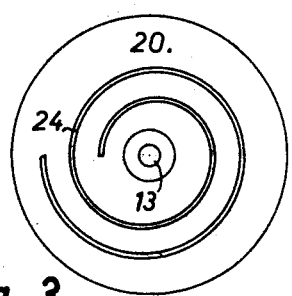
Figure 2:
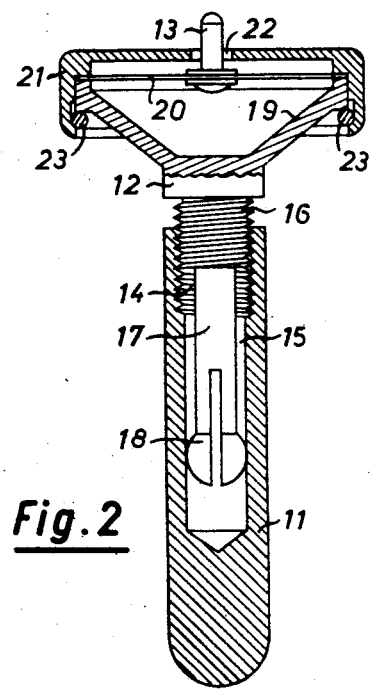

These and other objects and the advantages of the invention will best be understood from the following description of a specific embodiment when read in connection with the accompanying drawings in which is shown diagrammatically and by way of example, a construction in accordance with the present invention. Details which are not necessary for an understanding of the invention have, for the sake of greater clarity, been omitted from the drawings, in which:

Fig. 1 shows a fragmentary view of a laboratory balance provided with a device located in the base of the rack of the balance for stopping the pendulum oscillations of the carrier system pivoted on one arm of the balance beam, Fig. 2 is a vertical section through the spring housing provided with the brake pin, enlarged several times compared with Fig. 1, and Fig. 3 shows a top view corresponding to Fig. 2 of the disc-shaped spring provided with the brake pin.

Referring to Fig. 1, the column 2 is mounted on the base 1 of the balance rack on which column the balance beam 3 is fulcrumed. On one arm of the balance beam 3 a carrier system consisting of a bearing member 4, the carrier rods 5, the load or balance pan 6, and the hook 7 is suspended. In the base 1 a shaft 8 is pivotally mounted, said shaft being provided with an eccentric disc or cam 9 and an operating handle not shown and arranged outside the base 1. In a sliding bearing 10 fitted in the base 1 a cylindrical supporting member 11 is freely displaceably guided, said supporting member 11 bearing continuously on the eccentric disc 9 due to its inherent weight. In the cylindrical supporting member 11 is secured the bottom portion 12 of a spring housing 19 in which the brake pin 13 is resiliently arranged in a manner still to be described. The whole assembly is arranged in such a manner that by rotating the shaft 8 the brake pin 13 is brought into contact with the lower arcuate surface of the balance pan 6 and can also be withdrawn therefrom. Thus the lower arcuate surface of the balance pan 6 serves directly as a friction surface which preferably is high polished. The brake pin 13 thus may be caused to frictionally brake the swinging movement of the pan 6.

The detailed execution of the cylindrical supporting member 11 as well as the mounting of the brake pin 13 are shown several times enlarged in Figs. 2 and 3. The cylindrical supporting member 11 has an internal screw thread 14 and a central bore 15 in direct continuation thereof. The bottom portion 12 of the spring housing 19 has a mating external screw thread 16 by means of which it can be screwed into the cylindrical supporting member 11 in a longitudinally adjustable manner. In order to maintain the respective position set between the spring housing bottom portion 12 and the supporting member 11, the bottom portion 12 has in direct continuation of its screw thread a pin 17 provided with a spherical head 18 at its end, said head being split in the vertical direction. Radial expansion of the head 18 results in the latter being tightly pressed against the bore 15, thus preventing any unintentional relative rotation between the cylindrical supporting member 11 and the spring housing bottom portion 12. The upper portion 19 of the spring housing is funnel-shaped and serves as a seat for disc-shaped spring 20. In the center of said disc-shaped spring 20 the brake pin 13 is preferably secured by a rivet connection. Over the top end of the spring housing 19 and the disc spring 20 resting thereupon a cover 21 is fitted which has an aperture 22 through which the brake pin 13 freely projects with clearance on all sides. The outer edge of the disc spring 20 is clamped between the cover 21 and the top face surface of the spring housing 19. The cover 21 is in turn secured detachably to the spring housing 19 by means of an expanding spring wire 23. In order to obtain a very soft spring action of the brake pin 13 relative to the spring housing 19, according to Fig. 3 recesses 24 are provided in the disc spring 20 disposed between its outer edge and its central part, said recesses preferably being in the form of a continuous spiral 24 surrounding the brake pin 13. The brake pin 13 is thus freely sprung relative to the spring housing 19 without the necessity of any sliding bearings, and the relative mobility of the brake pin 13 with respect to the spring housing 19 is therefore unaffected by dust or the like.

The bottom portion 12 of the spring housing 19 is screwed into the cylindrical supporting member 11 to an extent that in the position of the accentric disc 9 shown in Fig. 1 the brake pin 13 just contacts the lower surface of the balance pan 6 without forcing the disc spring 20 (Fig. 2) downwardly. If now the shaft 8 is rotated anti-clockwise out of the position shown, the cylindrical supporting member 11 together with the spring housing 19 is lifted and the brake pin 13 presses with increased force against the balance pan 6, and the disc spring 20 is correspondingly bent downwardly in its central part. By lifting the spring housing more or less it is obvious that the braking force exerted by the brake pin 13 on the balance pan 6 can be very finely controlled, and the pendulum oscillations be quickly stopped. If the balance pan 6 is at rest then, by appropriately rotating the shaft 8, the brake pin 13 is withdrawn downwardly and removed from the balance pan 6.

Slight deposits of dust in the sliding bearing 10 are of no importance since the relatively large weight of the cylindrical supporting member 11 and the spring housing together with the cover 10 is sufficient to overcome any small additional friction in the sliding bearing 10. Cleaning of the sliding bearing 10 is therefore only infrequently necessary. For this purpose the balance pan 6 is either swung to one side, or the carrier rods 5 are unhooked from the hook 7. The cylindrical supporting member 11 and the spring housing 19 are then freely accessible and can be lifted upwardly out of the sliding bearing 10.

The friction surface against which the brake pin 13 is pressed is not necessarily the lower surface of the balance pan 6. By way of example, an additional disc-shaped friction member having an appropriate arcuate surface may be provided. Such a disc-shaped friction member is always used in cases where the respective carrier system is not provided with a balance pan at all, but is adapted for the reception of a set of weights only. When placing and lifting off weights, pendulum oscillations of the carrier system are also liable to occur which must be stopped before reading the balance. These and other modifications which may occur to those familiar with the art fall within the spirit and scope of the invention as set forth in the following claims.

I claim:

1. A friction member adapted to be vertically slidably mounted in the frame of a laboratory balance for engaging the balance scale to extinguish pendulum oscillations thereof, said friction member comprising a vertical cylindrical supporting member having a longitudinally-extending threaded bore at the upper end thereof, a spring housing having a screw-threaded lower portion threadably mounted within the bore of said vertical cylindrical supporting member to provide means for longitudinally displacing the spring housing relative to said cylindrical supporting member, said spring housing having a spring chamber at the upper end thereof, a cover element removably connected to said spring housing and forming an upper wall of said spring chamber, said cover having a centrally disposed aperture therein, a disc-shaped spring in said spring chamber and clamped at its peripheral edge intermediate said spring housing and said cover, and a vertical brake pin secured at its lower end to the central portion of said spring, said brake pin extending upwardly through the aperture in said cover for engagement with said scale.

2. A friction member as defined in claim 1 wherein said disc-shaped spring has a recess of spiral configuration in one surface thereof surrounding said brake pin.

References Cited in the file of this patent
UNITED STATES PATENTS

| | | |
|---|---|---|
| 2,612,042 | Clarke | Sept. 30, 1952 |
| 2,648,534 | Mettler et al. | Aug. 11, 1953 |
| 2,775,887 | Hires | Jan. 1, 1957 |
| 2,848,892 | Hoffman | Aug. 26, 1958 |

FOREIGN PATENTS

| | | |
|---|---|---|
| 622,271 | Great Britain | Apr. 28, 1949 |